United States Patent [19]

Gange

[11] 4,234,825
[45] Nov. 18, 1980

[54] SYSTEM FOR CONTROLLING BRIGHTNESS UNIFORMITY IN DISPLAY DEVICES

[75] Inventor: Robert A. Gange, Belle Mead, N.J.

[73] Assignee: RCA Corporation, New York, N.Y.

[21] Appl. No.: 31,461

[22] Filed: Apr. 19, 1979

[51] Int. Cl.³ .............................................. H01J 29/52
[52] U.S. Cl. .................................................... 315/383
[58] Field of Search ......................................... 315/383

[56] References Cited

U.S. PATENT DOCUMENTS

| | | | |
|---|---|---|---|
| 4,077,054 | 2/1978 | Endriz | 315/383 X |
| 4,121,137 | 10/1978 | Credelle | 315/383 X |
| 4,126,814 | 11/1978 | Marlowe | 315/307 |

Primary Examiner—Malcolm F. Hubler
Attorney, Agent, or Firm—G. H. Bruestle; V. J. Coughlin; L. L. Hallacher

[57] ABSTRACT

A system for controlling the emission of a device having a sense electrode for sensing a measure of an emission species from a source within the device. The sensed measure of the emission species is converted to a control signal. The output of the source is modified in response to the control signal by varying the time during which the source emits the emission species.

9 Claims, 2 Drawing Figures

SYSTEM FOR CONTROLLING BRIGHTNESS UNIFORMITY IN DISPLAY DEVICES

BACKGROUND OF THE INVENTION

The present invention relates to multi-electron beam image display devices and more particularly to means for controlling brightness uniformity in such devices by pulse width modulation of the multi-electron beam source.

Recently, many display devices have been suggested utilizing a plurality of electron beams, each of which illuminates a separate region of the entire display. One of the difficulties encountered in the use of separate electron beams for different portions of the display is that each beam will vary in terms of its electron current. This variation causes nonuniformity in the brightness of the displayed image. In order for such devices to be practical, the display must have a uniform brightness.

One method for achieving uniform brightness is described in U.S. Pat. No. 4,121,137 issued Oct. 17, 1978 to T. L. Credelle entitled "System for Achieving Image Uniformity in Display Devices." The Credelle system utilized a collector to sense the electron current of each beam. The level of the electron current of each beam is stored in a memory. When a particular beam is to be modulated, the memory is addressed so that the electron current level information for that beam is read out. The stored information and the incoming image element brightness information are combined to modulate the particular electron beam. One drawback of the Credelle system is that the collector is located in such a position within the display device that it can only sample the beam current before image information is displayed and during the vertical retrace time. The Credelle system does not permit continuous correction for brightness non-uniformities during operation. Another drawback of the Credelle system is that by sensing the current level in each beam, an inaccuracy is introduced into the correction system when the beam current level is very low.

Another method for achieving uniform brightness by controlling each electron gun is described in U.S. Pat. No. 4,126,814 issued Nov. 21, 1978 to F. J. Marlowe entitled "Electron Gun Control System." The Marlowe system uses a collector to sense the electron current from each gun. A comparator compares the sensed beam current signal with a brightness reference signal. The output of the comparator controls the generating of digital words. These digital words, which are stored in a memory, comprise mapping information to convert various brightness levels to voltages. During the display of an image, the video signal containing brightness information combines with the mapping information from the memory to bias the electron gun grids in order to generate electron beams which will illuminate the screen to the desired brightness level. Although the electron gun characteristics may vary from gun to gun of the display, the use of the reference brightness signal and the memory ensure that equalized beam currents will be generated for various brightness levels. The Marlowe system shares a common drawback with the Credelle system in that the collector is located in such a position within the display device that it can only sample the beam current before image information is displayed and during the vertical retrace of the display. Thus, neither the Marlowe system nor the Credelle system permit continuous correction for brightness non-uniformities during the display of image information.

A third method for achieving uniform brightness is described in U.S. Pat. No. 4,077,054 issued Feb. 28, 1978 to J. G. Endriz entitled "System for Modulating a Flat Panel Image Display Device." The Endriz system continuously senses an anode voltage proportioned to the instantaneously charge from electron beams impinging on the cathodoluminescent screen and compares the sensed voltage to a predetermined voltage waveform generated from the incoming video signal. A bias voltage corresponding to the relationship between the sensed voltage and the waveform voltage biases a modulation electrode to either increase or decrease electron flow to the anode. The resulting change in the magnitude of the negative charge build up on the anode produces a change in the bias voltage. For example, when the sensed anode voltage is less negative than the waveform voltage, the comparator biases the modulation electrodes so as to increase the electron flow thereby increasing the buildup of negative charge on the anode and decreasing the anode voltage. The Endriz system provides a feedback mechanism for controlling the flow of electrons so that a predetermined level of brightness set by the amplitude of the waveform voltage is obtained. A drawback of the Endriz system is that when the beam current level is low, inaccuracies are introduced into the correction system.

SUMMARY OF THE INVENTION

A system for controlling the emission of a device has a means for sensing a measure of an emission species from a source within the device. The sensed measure of the emission species is converted to a control signal. The output of the source is modified in response to the control signal.

DETAILED DESCRIPTION OF THE PREFERRED EMBODIMENT

The present novel structure provides means for compensating for non-uniform electron beams in a multi-electron beam display device having a plurality of beam guides so that the image will have uniform brightness. Non-uniformities may occur due to abnormal cathode aging, unanticipated movement of internal metal parts due to time dependent temperature gradients, losses during the extraction of the electron beams from the beam guides, or from transmission losses due to geometrical aberrations. Control of the brightness uniformity is provided at five equally spaced time intervals during each horizontal display line and is generally accomplished by sensing a voltage generated by the current of a plurality of electron beams which impinge on a sense electrode. The sensed voltage is then sampled and compared to a reference voltage. A control voltage is derived which is dependent upon the difference between the reference voltage and the sampled voltage. The control voltage is used to generate at least one timing pulse having a frequency which is dependent upon the control voltage. The timing pulse is used to modulate the pulse width of the electron beams emitted from the cathode.

Figure 1:
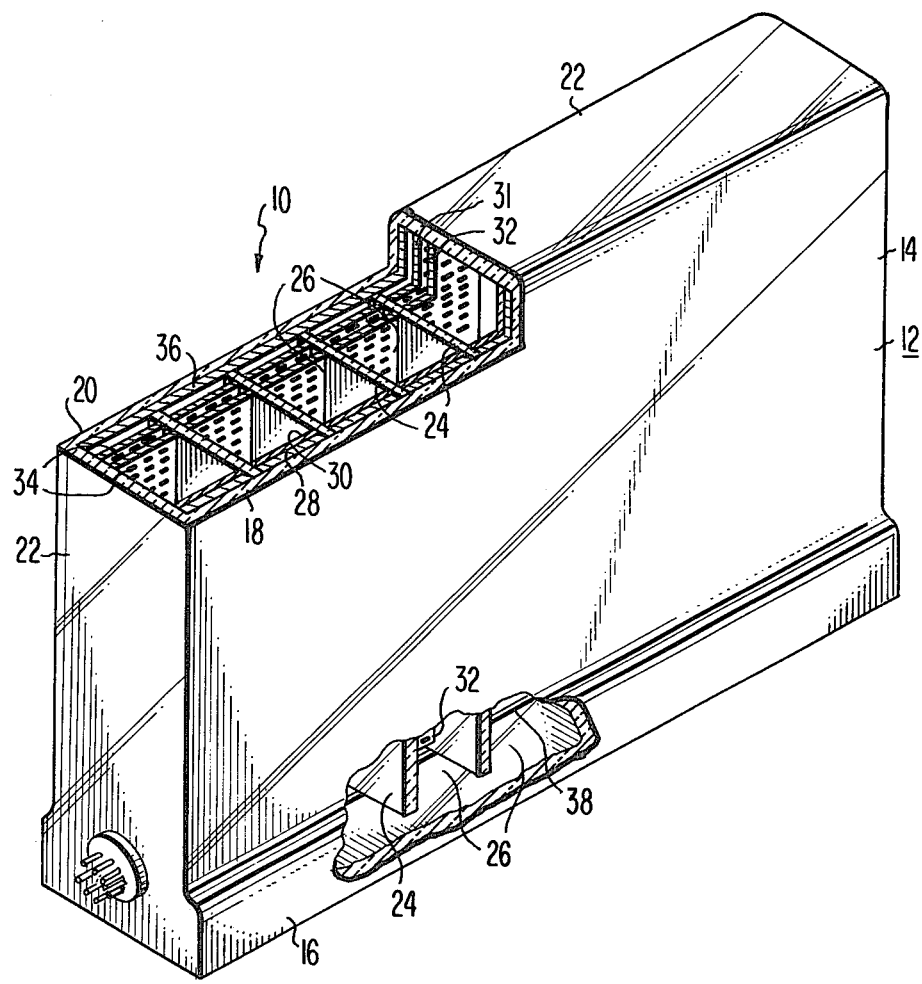
FIG. 1 is a perspective view partially broken away, of a flat display device into which the present invention can be incorporated.

Referring to FIG. 1, one form of a flat display of the present invention is generally designated as 10. The display device 10 comprises an evacuated envelope 12 typically of glass, having a display section 14 and an electron gun section 16. The display section 14 includes a rectangular front wall 18 and a rectangular back wall 20 in a spaced parallel relation with the front wall 18. The front wall 18 and the back wall 20 are connected by sidewalls 22. The front and back walls 18 and 20, respectively, are dimensioned to provide the size of the display desired, e.g. 75 by 100 cm, and are spaced apart about 2.5 to 7.5 cm.

A plurality of spaced, parallel support walls 24 are secured between the front wall 18 and back wall 20 and extend from the gun section 16 to the opposite sidewall 22. The support walls 24 provide the desired internal support for the evacuated envelope 12 against external atmospheric pressure and divide the display section 14 into a plurality of channels 26 (e.g., forty channels). On the inner surface of the front wall 18 is a phosphor screen 28. The phosphor screen 28 may be of any well known type presently used in cathode ray tubes. In a color display, the screen 28 alternates between red, green and blue emissive phosphors. A metal film electrode 30 partly transparent to electrons is provided on the phosphor screen 28.

In each of the channels 26 is a beam guide assembly of the type described in U.S. Pat. No. 4,088,920 to W. W. Siekanowicz et al., issued May 9, 1978, entitled "Flat Display Device with Beam Guide." Each of the beam guide assemblies includes a pair of spaced, parallel beam guide plates 31 and 32 extending transversely across and longitudinally along the channels 26. The first beam guide plate 31 is adjacent and parallel to the back wall 20 of the envelope 12 and the second beam guide plate 32 is between the first beam guide plate 31 and the front wall 18. The second beam guide plate 32 has a plurality of apertures 34 therethrough with the apertures being arranged in rows transversely across and columns longitudinally along the channels 26. The first beam guide plate 31 has similar apertures 34 therethrough with each of the apertures in the first beam guide plate 31 being in alignment with a separate aperture 34 in the second beam guide plate 32. Each pair of longitudinal columns of the apertures in the beam guide plates 31 and 32 forms a separate electron beam guide along the channels 26.

A plurality of spaced, parallel conductors 36 are on the back wall 20. The conductors 36 extend transversely across the channels 26 with each conductor 36 extending along a separate transverse row of apertures 34 in the beam guide plates 31 and 32. The conductors 36 are strips of an electrically conductive metal, coated on or bonded to the back wall 20.

The gun section 16 is an extension of the display section 14 and extends along one end of the channels 26. The gun section 16 may be of any shape suitable to enclose the particular gun structure contained therein. The electron gun structure contained in the gun section 16 may be of any well known construction suitable for selectively directing beams of electrons along each of the channels 26. For example, a gun structure may comprise a plurality of individual guns mounted at the ends of the channels 26 for directing separate beams of electrons along the channels. Alternatively, the gun structure may include a line cathode 38 extending along the gun section 16 across the adjacent channels 26 and adapted to selectively direct individual beams of electrons along each of the channels. A gun structure of this type is described in U.S. Pat. No. 4,121,130 issued to R. A. Gange on Oct. 17, 1978, entitled "Cathode Structure and Method of Operating the Same."

The electron beams travel from the gun section 16 along the channels 26 between the first and second beam guide plates 31 and 32. A plurality of electron beams travel along each of the channels 26. When the beams reach the line to be illuminated on the screen 28, the beams are extracted through the proper apertures 34 in the beam guide plate 32. This is accomplished by negatively biasing a conductor 36 on the back wall 20. The beams then strike the metal film electrode 30 comprising a plurality of discrete sense electrodes 40 on the phosphor screen 28. The brightness uniformity is controlled by varying the length of time that the beams are generated.

In the present device, the image display is presented as a succession of horizontal display lines, each horizontal line comprising about 640 picture elements. A color image display may be obtained by expanding the present system by any number of ways known to those having ordinary skill in the display tube art. However, for simplicity, a monochrome system will be described.

The line cathode 38 extends across the forty adjacent channels 26. That portion or sublength of the line cathode 38 extending across each of the channels 26 selectively directs sixteen beams of electrons along each of the channels. In order to minimize the number of uniformity control components, the display is arbitrarily divided into five equal sections, each section comprising eight channels 26. This arbitrary division requires a maximum of eight uniformity control circuits to control the brightness uniformity of the entire display. Video information for these five equal sections is processed sequentially so that only eight adjacent sublengths of the line cathode 38, corresponding to one-fifth of the horizontal display line, are simultaneously "on," i.e., generating 128 electron beams at any given time. Thus, the time for displaying a horizontal line of information, approximately 60 μsec., is divided into five time intervals of approximately 12 μsec. each. Brightness uniformity corrections occurs at five equally spaced times during the generation of each horizontal display line.

During the first fifth of the horizontal display line time interval (approximately 12 μsec), the first eight adjacent sublengths of line cathode 38 are "on" while during the second fifth of the line time the second eight adjacent sublengths of the line cathode 38 are "on," and so on until the last eight adjacent sublengths are "on" during the last fifth of the horizontal display line time interval.

Figure 2:
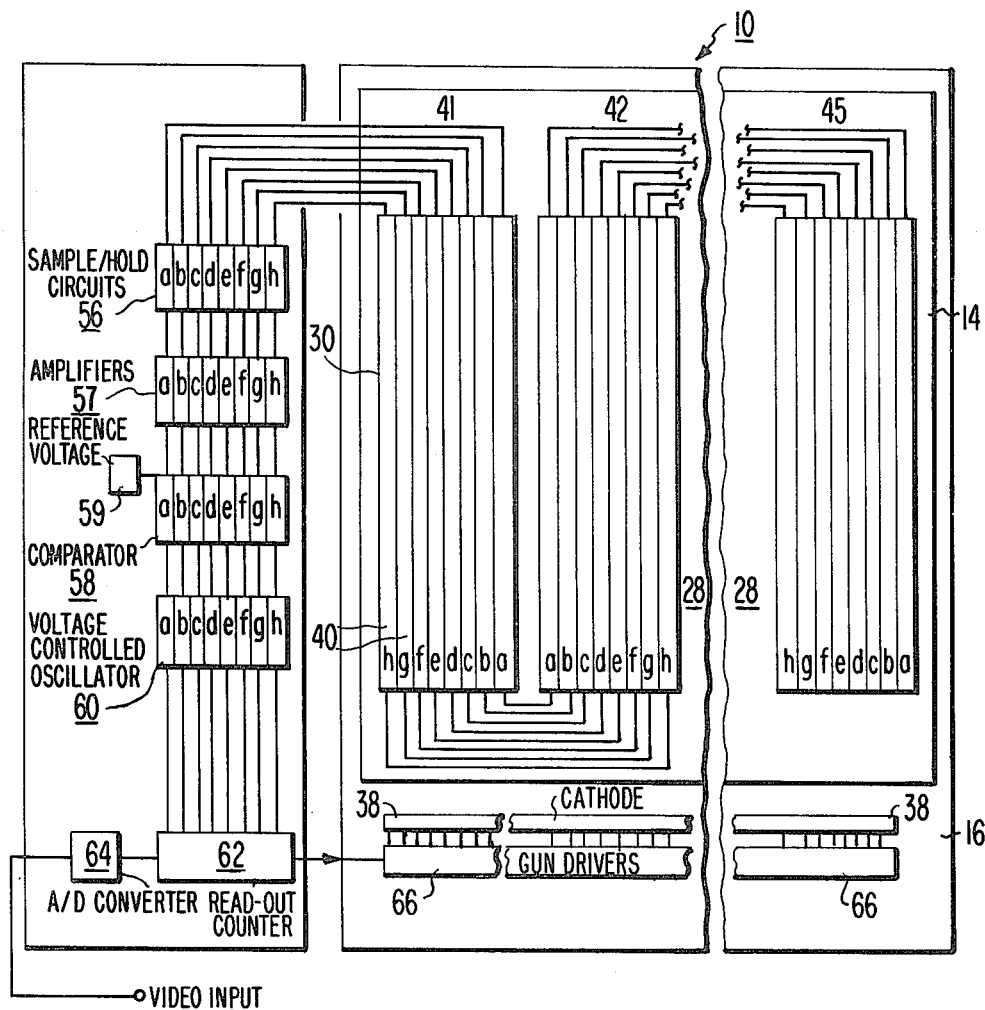
FIG. 2 is a block diagram of a sense electrode pattern and a circuit for equalizing each of the electron beams in the display device.

As shown in FIG. 2, the sense electrodes 40 on phosphor screen 28 are also arbitrarily divided into five major groups, 41-45, corresponding to the five equal display sections described above. Each of the five major groups of sense electrodes has been further subdivided into eight sense electrode subgroups, a-h, so that there are forty equally spaced sense electrodes along a horizontal display line, one sense electrode for each of the forty channels 26. That portion of the screen 28 included in the first major group 41 contains 128 picture elements with sixteen picture elements in each of the eight sense electrode subgroups A-h of the major group. The eight sense electrodes 41 a-h in the first major group are patterned in parallel arrangement with each other; however, each sense electrode 41 *a–h* of the first subgroup is connected in series with one sense electrode *a–h* in each of the other four major groups 42–45.

As shown in FIG. 2, each of the eight sense electrodes 41 *a–h* of the first major group 41 is connected to a different one of eight sample-and-hold circuits 56 *a–h*. The sensed voltage output of each of the sample-and-hold circuits 56 *a–h* may be connected to a different one of eight amplifiers 57 *a–h*, or if amplification is not required, the output may be connected directly to an input terminal of a different one of eight comparators 58 *a–h*. A second input terminal of each of the comparators 58 *a–h* is connected to a reference voltage source 59 which controls the maximum brightness of the display. The output of each of the comparators 58 *a–h* is a control voltage dependent upon the difference between the reference voltage and the sensed voltage. Each control voltage is connected to a different one of eight voltage controlled oscillators 60 *a–h*. The output of each of the voltage controlled oscillators 60 *a–h* is connected to a read-out counter 62. The read-out counter 62 has sufficient storage locations to store a word of information for each of the picture elements in a horizontal display line. A video signal representing the brightness information is fed into an analog-to-digital converter 64 (hereinafter called an A/D converter). The output of the A/D converter 64 is a series of six-bit words, one word for each of the 640 picture elements in the horizontal display line. The six-bit words are stored in the read-out counter 62. Each of the six-bit words is capable of producing sixty-four levels of brightness. The output from the read-out counter 62 is connected to a plurality of gun drivers 66 which control the generation of electrons from the line cathode 38.

With reference to FIG. 2, when the display is turned on, the incoming sequential video signal is digitized by a single A/D converter 64 into a series of six-bit words. While one A/D converter is preferred, three may be used, one for each color. If three A/D converters are used, they may be organized in any one of several different color schemes apparent to anyone having ordinary skill in the display tube art. The digitized video signal is serially fed into the readout counter 62.

During the first 90 nsec. of the sampling interval of the first fifth of the delay line, the countdown of the first 128 six-bit words or pulses stored in the readout counter 62 is simultaneously begun. the countdown is initiated by voltage pulses from the oscillators 60 *a–h* which clock out of the counter 62, one bit at a time, the stored pulses which, in turn, simultaneously turn on the 128 gun drivers 66. Each of the first eight sense electrodes 41 *a–h* in the first major group develop a voltage, $V_j = Q_j/C$, in which $Q_j$ is the charge on the jth sense electrode, (j=1-8) resulting from the sixteen electron beams impinging thereon. C is the capacitance of the sense electrode, including the interconnecting structure between other elements of the system. Although the 128 gun drivers 66 are initially "on" for the same period of time, the electron currents may be unequal, therefore in general, $Q_j$ may be different among the eight sense electrodes 41 *a–h*. Each of the sensed voltages generated during the initial period of time referred to above is sampled, amplified if necessary, and compared to a reference voltage by one of the eight comparators 58 *a–h*. The reference voltage may be preset to either increase or decrease the maximum brightness level of the display device. The output of each of the comparators 58 *a–h* is a control voltage which is dependent upon the difference between the reference voltage and the control voltage. The control voltage output of each of the eight comparators 58 *a–h* is fed to one of the eight different voltage controlled oscillators 60 *a–h*.

Each of the oscillators 60 *a–h* generates at least one timing pulse or clock-rate having a repetition frequency which is dependent upon the control voltage. The rates of countdown in the read-out counter 62 are controlled by the repetition frequencies of the timing pulses from the eight oscillators 60 *a–h* which adjust the pulse timing or countdown interval for each of the eight sublengths of line cathode 38 addressed by the gun drivers 66 which are connected to the read-out counter 62. The adjustment of the pulse width or the time interval of all successive countdowns for each of the remaining countdown pulses or bits of the six-bit words stored in the read-out counter 62 for each of the eight sublengths of line cathode 38 corresponding to the first 128 picture elements of the horizontal line provides a high degree of brightness uniformity for the first one-fifth of the horizontal display line.

To control the brightness uniformity of the display during the second fifth of the picture line time, the voltages generated by bits of the six-bit words stored in counter 62 which impinge upon the eight sense electrodes 42 *a–h* in the second major group are used to establish new oscillator frequencies during the initial 90 nsec. sampling interval of the next 1/5 of the line time. The new frequencies are then used to control the countdown of the remaining bits of the 128 six-bit words associated with the second fifth of the display line which are stored in readout counter 62. The potentials are thus sampled, stored and compared with the reference voltage to independently establish new clock rates for each of the eight voltage controlled oscillators 60 *a–h*. The countdown of the remaining six-bit words in the read-out counters 62 at the new pulse "time intervals" uniquely establish for each of the second eight sublengths of line cathode 38, identifiable with the second major group 42, the second fifth of the display line to the same high degree of brightness uniformity achieved for the first fifth of the display line.

The control sequence described above is repeated for the remaining three fifths of the picture line until an entire horizontal line is displayed. Thus, brightness uniformity corrections are made five times during each horizontal display line. The same control sequence is repeated for each subsequent horizontal line in the display.

The structure described above for controlling the brightness uniformity of a display device may be applied to other devices not restricted to the display tube art. However, these devices must have an analog signal input which can be digitized by an A/D converter and stored in some type of memory. The emission from any such device having a digitally controlled source with a detectable emission species can then be controlled by sensing a signal which is a measure of the emission species, converting the sensed signal to a control signal, using the control signal to control the output of an oscillator so that the oscillator output is a timing pulse having a frequency which is dependent upon the control voltage, and using the timing pulse to countdown the stored digitized signal and thereby pulse width modulate the source by varying the time during which the device emits an emission species.

I claim:

1. A system for controlling the brightness uniformity of a display device having a digitally controlled beam generating means for generating a plurality of electron beams, and a display screen for producing a visual display in response to impact by said electron beams, said system comprising:

sensing means for sensing a voltage from a plurality of beams which impinge on at least one sense electrode in the proximity of said display screen;

converting means for converting the sensed voltage to a control voltage; and modifying means for modifying the beam generating means in response to said control voltage so as to compensate for non-uniform electron beam currents by varying the period of time during which electrons are generated by the beam generating means.

2. A system as in claim 1 wherein said converting means comprises:

a sample-and-hold circuit for sampling said sensed voltage, said circuit having an input connected to said sense electrode; and a voltage comparator connected between said sample-and-hold circuit and said modifying means, said comparator having a reference voltage which is compared to said sensed voltage so as to generate a control voltage which is dependent upon the difference between said reference voltage and said sensed voltage.

3. A system as in claim 2 wherein said modifying means comprises a voltage controlled oscillator connected between said voltage comparator and said beam generating means, said oscillator having an output with a frequency which is dependent upon the control voltage, said output comprises at least one timing pulse for controlling the period of time during which electrons are generated by the beam generating means.

4. A system for controlling the brightness uniformity of a display device having an evacuated envelope with substantially parallel front and back walls, a cathodoluminescent screen on the front wall, an electron beam guide in spaced relation to said back wall, said beam guide being disposed substantially parallel to said screen, said beam guide comprising a pair of spaced apart, elongated guide grids having a plurality of apertures therethrough, said apertures being arranged so as to define a plurality of rows across and columns along said guide grids, digitally controlled generating means at one end of said beam guide for generating at least one beam of electrons between said guide grids, said at least one beam being selectively deflected through one of said rows of apertures toward said screen, sensing means for sensing a voltage generated by said deflected beam of electrons which impinges on a sense electrode in the proximity of said screen, a sample-and-hold circuit connected to said sense electrode for sampling said sensed voltage;

a voltage comparator connected to said sample-and-hold circuit, said comparator having a reference voltage which is compared to said sensed voltage so as to generate a control voltage which is dependent upon the difference between said reference voltage and said sensed voltage; and modifying means for modifying said electron beam generating means in response to said control voltage in order to compensate for non-uniform electron beam currents by controlling the period of time during which beams of electrons are generated by said generating means.

5. A system as in claim 4 wherein said modifying means comprises a voltage controlled oscillator having an output of at least one timing pulse, said pulse having a frequency which is dependent upon said control voltage, said output being used to control the period of time during which beams of electrons are generated by said generating means.

6. A system for controlling the brightness uniformity of a display device having an evacuated envelope with substantially parallel front and back walls, a plurality of support walls between and substantially perpendicular to said front and back walls forming a plurality of parallel channels extending across the front and back walls, a cathodoluminescent screen on the front wall, an electron beam guide in each of said channels, each of said beam guides being disposed substantially parallel to said screen, a digitally controlled electron generating means extending across one end of each of said beam guides for generating a plurality of electron beams into each beam guide, a plurality of discrete sense electrodes disposed on said screen for sensing a voltage generated by said electron beams which impinge on said sense electrodes, a plurality of sample-and-hold circuits, each circuit being connected to a different one of said sense electrodes, for sampling said sensed voltage, a plurality of voltage comparators, each of said comparators being connected to a different one of said sample-and-hold circuits, each of said comparators having a reference voltage which is compared to said sensed voltage so as to generate a control voltage which is dependent upon the difference between said reference voltage and said sensed voltage, and a plurality of voltage controlled oscillators, each of said oscillators being connected to a different control voltage, each of said oscillators having an output of at least one timing pulse, said timing pulse having a frequency which is dependent upon said control voltage, said timing pulse being used to control the period of time during which beams of electrons are generated by said generating means.

7. A system for controlling the brightness uniformity of a display device having a display screen and a plurality of channels in which propagating electron beams are deflected toward said screen, said system comprising:

a plurality of sense electrodes equal in number to said plurality of channels arranged along said display screen, each of said sense electrodes spanning one of said channels so that said sense electrodes are struck by at least a portion of said deflected electron beams to generate sensed voltages, said sense electrodes being divided into groups with each group having an equal number of said sense electrodes;

sensing means successively responsive to said groups of sense electrodes for successively sensing said voltages;

converting means for converting said sensed voltages to control voltages, and modifying means for modifying said electron beams in response to said control voltages to compensate for non-uniform electron beam currents by varying the period of time during which said electron beams are generated.

8. The system of claim 7 wherein said converting means includes:

sample-and-hold circuit means responsive to said sense electrodes for sampling said sensed voltages;

voltages comparator means responsive to said sample-and-hold means and actuating said modifying means, said comparator means having a reference voltage which is compared to said sensed voltage to generate a control voltage dependent upon the difference between said reference voltage and said sensed voltage.

9. The system of claim 8 wherein said modifying means includes a voltage controlled oscillator, said oscillator providing an output signal having a frequency dependent upon said control voltage and including at least one timing pulse for controlling the period of time during which said electron beams are generated.

* * * * *